(12) United States Patent
Kokemohr

(10) Patent No.: US 9,690,467 B2
(45) Date of Patent: Jun. 27, 2017

(54) GRAPHICAL USER INTERFACE AND RELATED METHOD

(71) Applicant: Google Inc., Mountain View, CA (US)

(72) Inventor: Nils Kokemohr, Hamburg (DE)

(73) Assignee: Google Inc., Mountain View, CA (US)

( * ) Notice: Subject to any disclaimer, the term of this patent is extended or adjusted under 35 U.S.C. 154(b) by 370 days.

(21) Appl. No.: 14/194,481

(22) Filed: Feb. 28, 2014

(65) Prior Publication Data

US 2014/0250396 A1 Sep. 4, 2014

Related U.S. Application Data

(63) Continuation of application No. 11/763,294, filed on Jun. 14, 2007, now Pat. No. 8,701,028.

(60) Provisional application No. 60/804,822, filed on Jun. 14, 2006.

(51) Int. Cl.
*G06F 3/048* (2013.01)
*G06F 3/0484* (2013.01)
*G06F 3/0481* (2013.01)

(52) U.S. Cl.
CPC ...... *G06F 3/04847* (2013.01); *G06F 3/04812* (2013.01); *G06F 3/04845* (2013.01)

(58) Field of Classification Search
None
See application file for complete search history.

(56) References Cited

U.S. PATENT DOCUMENTS

| 5,638,496 | A | 6/1997 | Sato |
| 6,304,261 | B1 * | 10/2001 | Shields ............... G06F 3/0488 |
| | | | 715/702 |
| 6,535,301 | B1 | 3/2003 | Kuwata |
| 6,633,304 | B2 | 10/2003 | Anabuki |
| 6,882,354 | B1 * | 4/2005 | Nielsen ............... G06F 3/013 |
| | | | 715/784 |
| 2003/0122951 | A1 | 7/2003 | Hara |
| 2005/0156818 | A1 | 7/2005 | Tsuji |
| 2006/0034540 | A1 | 2/2006 | Zavadsky et al. |
| 2006/0082677 | A1 | 4/2006 | Dounomae |

FOREIGN PATENT DOCUMENTS

| JP | 7162677 | 6/1995 |
| JP | 10091761 | 4/1998 |
| JP | 886437 | 12/1998 |

(Continued)

OTHER PUBLICATIONS

How to Wow with InDesign CS2, Rankin et al, Aug. 16, 2005, pp. 10, 17, 143, 150-152.*

(Continued)

*Primary Examiner* — Matthew Ell
(74) *Attorney, Agent, or Firm* — IP Spring

(57) ABSTRACT

A graphical user interface that is embodied in a computer-readable medium for execution on a computer, and configured for processing of an image that is displayed on a screen. The graphical user interface includes an original version of a control element, and a blurred version of the control element. The blurred version of the control element is superimposed over the image on the screen, and the original version of the control element is superimposed over the blurred version of the control element on the screen.

20 Claims, 4 Drawing Sheets

(56) References Cited

FOREIGN PATENT DOCUMENTS

| JP | 11146219 | 5/1999 |
|----|----------|--------|
| JP | 2000151985 | 5/2000 |
| JP | 200167469 | 3/2001 |
| WO | 2007147081 | 12/2007 |

OTHER PUBLICATIONS

Korean Intellectual Property Office (KIPO); International Preliminary Report on Patentability and Written Opinion for PCT/US2007/071258; Dec. 16, 2008; 5 Pages.
Rankin et al.; "How to Wow with InDesign CS2"; Aug. 16, 2005, pp. 10, 17, 143, and 150-152.
Reding, Elizabeth Einser; "Adobe Photoshop CS2 Revealed"; Jan. 1, 2006; pp. 250-253.
Chiyo et al.; Senmtakuhanni-hen, Mac fan Special 14, Feb. 22, 2001; pp. 51-70, Mainichi Communications Japan.
Non-Final Office Action datedDec. 12, 2012 issued in corresponding U.S. Appl. No. 11/763,294.
Final Office Action dated Jul. 12, 2013 issued in corresponding U.S. Appl. No. 11/763,294.
Notice of Allowance dated Nov. 21, 2013 issued in corresponding U.S. Appl. No. 11/763,294.
Patent Abstracts of Japan; JP Publication 2000-151985; May 30, 2000; 2 Pages.
Patent Abstracts of Japan; JP Publication 10-091761; Apr. 10, 1998; 2 Pages.
Patent Abstracts of Japan; JP Publication 2001-067469; Mar. 16, 2001; 1 Pages.

\* cited by examiner

GRAPHICAL USER INTERFACE AND RELATED METHOD

CROSS-REFERENCE TO RELATED APPLICATION

Priority is claimed under 35 U.S.C. §119(e) to U.S. Non-Provisional Patent Application No. 11/763,294, filed on Jun. 14, 2007, and U.S. Provisional Patent Application No. 60/804,822, filed on Jun. 14, 2006, which are incorporated by reference herein.

FIELD OF THE INVENTION

The present invention relates generally to graphical user interfaces that are designed for image editing. More specifically, the invention relates to graphical user interfaces and a related method for displaying a control element on a screen for viewing by a user.

BACKGROUND

Many software applications that are designed for image editing display a region of control (sliders, buttons, text entry fields, levers, pop up menus, radio buttons etc.) in one area of the screen resp. in one window, while they, obviously, also display the image being edited in a different area of the screen resp. in a different window.

In the recent years, computers have become so powerful that the image being displayed can be updated in real-time while the user is modifying image editing parameters. For instance, if a user wanted to change the brightness of an image some years ago, he would for instance modify a slider and possibly even press a so-called "OK button", and only then the brightened image would be displayed to the user.

In recent years faster computers make it possible that the computer recalculates the image frequently, possibly even several times a second, so that the user can now see the brightened or darkened image while he is moving the slider.

However, since current image editing applications are designed in a way that the image enhancement controls (from now on simply referenced as "controls") are displayed spatially remote from the image, the user has to change the focus of his eye frequently from control to image and back.

The system proposed herein enables the user to edit the controls exactly at the same position of the image—possibly even exactly at the location of interest within the image.

The most natural way to do this is to create a (preferably small) window that holds the controls, where this window could be displayed as a "floating" window over the image, at any position where the user likes it. In reality, this does not really work since the window is typically very distracting, so most users would tend to move this dialog window away from the area of interest in the image.

The invention disclosed herein remedies these disadvantages.

SUMMARY

A graphic user interface is disclosed that separates the interface of an image enhancement into primary and secondary control elements, superimposing the primary control elements over the image (while not superimposing the secondary control elements), superimposing the primary control elements in a blurred and a non-blurred fashion, so that only a minimal amount of pixels in the image is affected, while the graphic representation of the primary control elements is still always visible, reducing the opacity of elements when the mouse cursor is further away, and putting the opacity of the primary control elements to zero when the mouse is not over the image.

An exemplary embodiment of the invention is a graphical user interface that is embodied in a computer-readable medium for execution on a computer, and configured for processing of an image that is displayed on a screen. The graphical user interface includes an original version of a control element, and a blurred version of the control element. The blurred version of the control element is superimposed over the image on the screen, and the original version of the control element is superimposed over the blurred version of the control element on the screen.

In other, more detailed features of the invention, the original version of the control element has a first brightness value, the blurred version of the control element has a second brightness value, and the first brightness value is different from the second brightness value. Also, the first brightness value can be less than the second brightness value. In addition, the computer can be configured to use a brightness-inversion routine to determine the second brightness value based on the first brightness value.

In other, more detailed features of the invention, the image that is displayed on the screen is configured to be viewed by a user, the image includes tonalities, and the resulting combination of the superimposed original version of the control element over the blurred version of the control element is visible at all times and over all possible tonalities of the image by the user. Also, the control element can include features such as a slider, a pop up menu, a text entry field, a button, an OK button, or a Cancel button.

In other, more detailed features of the invention, the control element includes a slider that has a position on the screen, and the slider includes a part that is displayed on the screen, and that has a length that is dependent upon the slider's position on the screen. Also, the control element can be configured to adjust a setting that is associated with an image filter, which can be a global filter, a location-based filter, an image brightness changing filter, a filter that simulates sun beams, a filter that is based on a spatial location of the image, a lens flare filter, a radial blur filter, or an image reference point filter.

In other, more detailed features of the invention, the graphical user interface further includes a pointing device symbol that is configured to be superimposed over the image, the original version of the control element, and the blurred version of the control element on the screen. The control element has a value, the screen is configured to be viewed by a user, and the user can adjust the value of the control element by altering a position of the pointing device symbol on the screen. Also, the pointing device symbol can be a mouse cursor.

In other, more detailed features of the invention, the control element is a primary control element that is an enhancement parameter, a number readout of a setting, an opacity of an effect, a strength of an effect, a color of an effect, or a slider that is configured to define a blur radius. Also, the control element can be a secondary control element that is a title of an effect, a title of an enhancement, an OK button, a Cancel button, a number readout of a setting, or an opacity of an effect.

In other, more detailed features of the invention, the control element includes a primary control element and a secondary control element. The blurred version of the primary control element is superimposed over the image. An original version of the primary control element is superimposed over a blurred version of the primary control element. The screen includes an area that is outside of the image. The secondary control element is displayed in the area that is outside of the image without an underlying blurred version of the secondary control element.

In other, more detailed features of the invention, the graphical user interface further includes an original version of an icon, and a blurred version of the icon. The original version of the icon is in the neighborhood of the original version of the control element. The blurred version of the icon is in the neighborhood of the blurred version of the control element. The blurred versions of the icon and the control element are superimposed over the image on the screen. The original versions of the icon and the control element are superimposed over the blurred versions of the icon and the control element on the screen. Also, the original version of the icon can have a circular shape. Optionally, the original version of the icon may be graphically linked to the original version of the control element, and the blurred version of the icon may be graphically linked to the blurred version of the control element.

In other, more detailed features of the invention, the graphical user interface further includes a pointing device symbol that is configured to be superimposed over the image, the original versions of the control element and the icon, and the blurred versions of the control element and the icon on the screen. Also, the computer is configured to calculate where the superimposed original version of the icon is located relative to the image, and where the pointing device symbol is located relative to the image. In addition, the control element can include more than one control element, and the graphical user interface can be configured to display those original versions of the control elements that are spatially remote from the pointing device symbol with a lower value of opacity, and to display those original versions of the control elements that spatially are closer to the pointing device symbol with a higher value of opacity. Furthermore, the graphical user interface can be configured to hide the original and blurred versions of the control element when the pointing device symbol is not positioned over the image.

Another exemplary embodiment of the invention is a graphical user interface that is embodied in a computer-readable medium for execution on a computer, and configured for processing of an image that is displayed on a screen. The graphical user interface includes a control element and a halo. The control element is superimposed over the image on the screen, has a first brightness value, and includes a feature. The halo is superimposed over the image on the screen, has a second brightness value, and surrounds the feature. The first brightness value is different from the second brightness value.

In other, more detailed features of the invention, the halo is generated from a blurred version of the feature. Also, the feature can be an alphanumeric character, a geometric shape, a slider, a pop up menu, a text entry field, a button, an OK button, and a Cancel button. In addition, the graphical user interface can further include an icon that is superimposed over the image on the screen, and a halo that surrounds the icon, and is superimposed over the image on the screen. The icon is in the neighborhood of the feature of the control element, and the halo that surrounds the icon is in the neighborhood of the halo that surrounds the feature of the control element. The icon may be graphically linked to the feature of the control element.

In other, more detailed features of the invention, the graphical user interface further includes a pointing device symbol that is configured to be superimposed over the image, the control element, the halo that surrounds the feature of the control element, the icon, and the halo that surrounds the icon on the screen. Also, the computer is configured to calculate where the superimposed icon is located relative to the image, and where the pointing device symbol is located relative to the image. In addition, the control element can include more than one control element, and the computer can be configured to display those control elements that are spatially remote from the pointing device symbol with a lower value of opacity, and to display those control elements that spatially are closer to the pointing device symbol with a higher value of opacity. Furthermore, the graphical user interface can be configured to hide the control element and the halo when the pointing device symbol is not positioned over the image.

Another exemplary embodiment of the invention is a graphical user interface that is embodied in a computer-readable medium for execution on a computer, and configured for processing of an image that is displayed on a screen. The graphical user interface includes a control element and a border. The control element is superimposed over the image on the screen, has a first brightness value, and includes a feature. The border is superimposed over the image on the screen, has a second brightness value, and surrounds the feature. The first brightness value is different from the second brightness value.

In other, more detailed features of the invention, the border is generated from a blurred version of the feature. Also, the control element can include a primary control element and a secondary control element, where the primary control element is superimposed over the image, the screen includes an area that is outside of the image, and the secondary control element is displayed in the area that is outside of the image. In addition, the secondary control element can be displayed without the border in the area that is outside of the image.

In other, more detailed features of the invention, the graphical user interface can further include an icon that is superimposed over the image on the screen, and a border that surrounds the icon, and is superimposed over the image on the screen. The icon is in the neighborhood of the feature of the control element, and the border that surrounds the icon is in the neighborhood of the border that surrounds the feature of the control element. The icon may be graphically linked to the feature of the control element.

In other, more detailed features of the invention, the graphical user interface further includes a pointing device symbol that is configured to be superimposed over the image, the control element, the border that surrounds the feature of the control element, the icon, and the border that surrounds the icon on the screen. Also, the computer is configured to calculate where the superimposed icon is located relative to the image, and where the pointing device symbol is located relative to the image. In addition, the graphical user interface can be configured to hide the control element and the border when the pointing device symbol is not positioned over the image.

An exemplary method according to the invention is a method for displaying a control element and an image on a screen for viewing by a user. The method includes providing the image, displaying the image on the screen, providing an original version of the control element, generating a blurred version of the control element, superimposing the blurred version of the control element over the image on the screen, and superimposing the original version of the control element over the blurred version on the screen.

In other, more detailed features of the invention, the method further comprises providing a brightness-inversion routine, and using the brightness-inversion routine to determine the second brightness value based on the first brightness value. Also, in more detailed features of the invention, the above method steps are repeated after the control element is adjusted by the user.

In other, more detailed features of the invention, the method further includes providing an original version of an icon that graphically is linked to the original version of the control element, generating a blurred version of the icon that graphically is linked to the blurred version of the control element, superimposing the blurred versions of the icon and the control element over the image on the screen, and superimposing the original versions of the icon and the control element over the blurred versions of the icon and the control element.

In other, more detailed features of the invention, the method further includes providing a pointing device symbol that is configured to be superimposed over the image, the original version of the control element, and the blurred version of the control element. The control element includes more than one control element. The control elements that are spatially remote from the pointing device symbol are displayed with a lower value of opacity, and the control elements that are spatially closer to the pointing device symbol are displayed with a higher value of opacity.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

DETAILED DESCRIPTION 1.1 The UI of this Invention

The invention described herein functions for all kinds of image filters, for instance an image brightness changing filter. The controls (preferably sliders) are overlaid over the image so that preview area (the image) and the controls as well as the pointing device symbol (aka "mouse cursor") are all on the same area.

Figure 1:
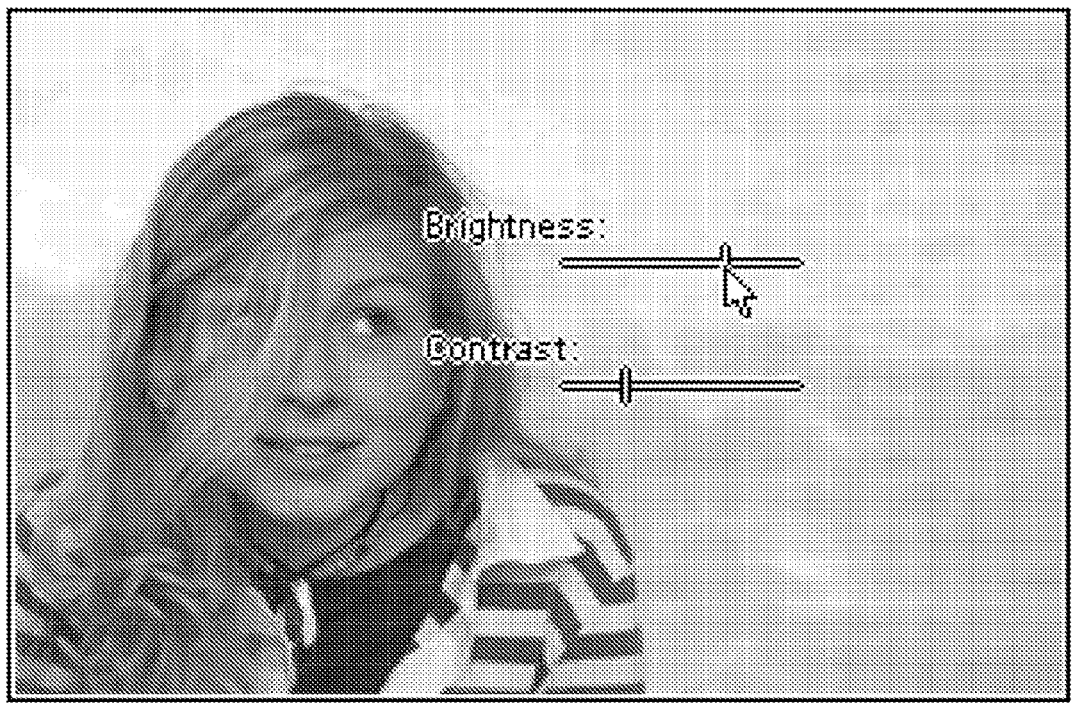
FIG. 1 is a display of digital image superimposing primary control elements over image preview.

This could be done as shown in FIG. 1. The trick is to reduce the interface holding the control elements to exactly the amount of "functional pixels", and to replace everything that is not functional with the actual image. This means that most elements of a windows typically containing control elements are omitted, particularly the window frame, window title, window fill color (often a light gray), separator lines, etc. The remaining elements are overlaid over the image using a bright or dark halo, so that the control elements are visible in dark as well as in bright portions of the image. We'll call these elements the "primary control elements" of an enhancement.

Typically, an image editing application offers many different enhancements, therefore, the user has a need to understand which enhancement is currently being applied, and he needs to be able to confirm or discard the enhancement. Therefore an enhancement (such as the Gaussian blur from Adobe® Photoshop) has not only primary control elements (a slider defining the blur radius), but also "secondary control elements", such as an effect title display (The type case "Gaussian Blur"), an OK and a Cancel button as well as other information.

Examples for primary and secondary control elements are the following:

| Title of Enhancement | Secondary |
| Enhancement Parameters | Primary |
| Number readouts of Settings | Primary or Secondary |
| OK button | Secondary |
| Cancel button | Secondary |
| Opacity of Effect | Primary or Secondary |

Figure 2:
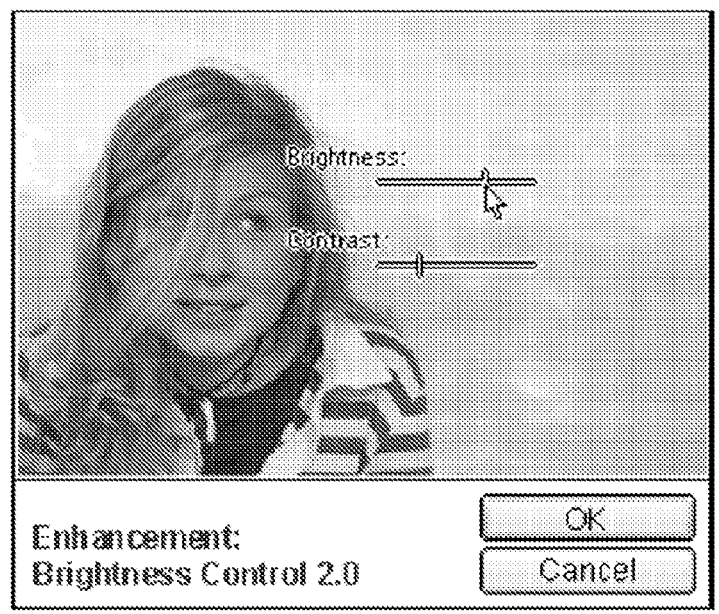
FIG. 2 is a display of digital image superimposing primary control elements over image preview, and the secondary control elements outside the image area.

In another embodiment, it may be desirable to display the secondary control elements outside the image area and to display the primary control elements overlaid to the image as described above, see FIG. 2.

1.2 Position Related Effects

Section 1.1 has described how normal, "global" filters can be implemented so that the user can modify the parameters at the same location where he's observing the image and the changes.

There are some filters that are based upon a certain spatial location of the image. For instance, a filter that simulates sun beams would require a center point as an origin for the sun beams. Some other filters that are based upon one (or more) spatial locations of the image are the following:

Lens Flare
Radial Blur
Image Reference Point ("IRP") based image editing (as described in U.S. Pat. No. 7,031,547 entitled "User definable image reference points"; U.S. Pat. No. 6,865,300 entitled "User definable image reference points"; and U.S. Pat. No. 6,728,421 entitled "User definable image reference points", which disclosures are incorporated herein by reference.)

Some location-based filters may require a single location, while others may require several locations. These filters also can benefit from the invention disclosed herein. Preferably, little icon(s) are displayed at the location(s) of interest. If the image enhancement also has parameters beyond the location, such as effect strength or effect color, then these parameter controls (the "primary control elements") can be displayed in the spatial whereabouts of the icon(s) representing the location(s) of interest.

If each of the locations of interest is associated with individual image modification parameters, then primary control elements should be displayed for each of the icons representing the locations of interest.

Figure 3:
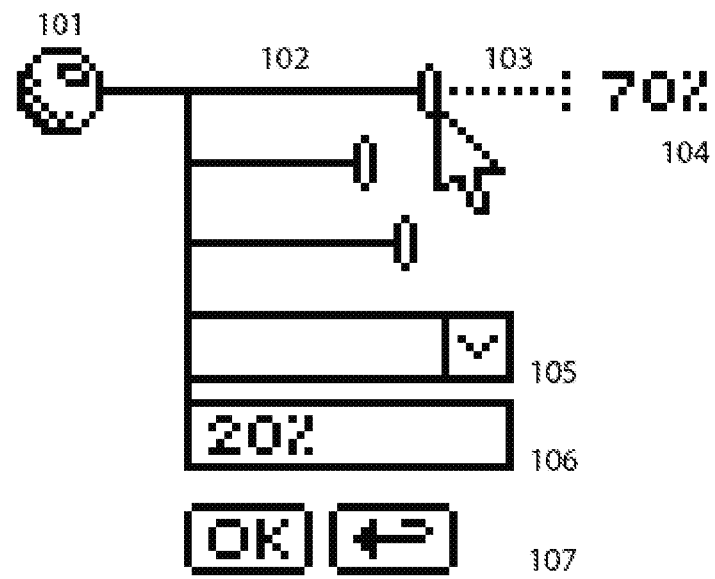
FIG. 3 is an embodiment of a graphic user interface usable in the present invention.

FIG. 3 shows how one of these icons at a location of interest associated with primary control elements can look like, showing possible elements of an IRP interface. The first image shows just the elements, while in the second image a gray area indicates where the image is visible and where not. The control elements could comprise such features as, for example, a slider, a pop up menu, a text entry field, a button, an OK button, or a Cancel button. Other features are possible. In the example in FIG. 3, 101 is the icon representing the IRP, 102 is a slider, 103 is a part of the slider that is only shown when the slider is used and hidden when the slider is not used (note that users still understand a slider and it's setting when part of the slider is omitted), 105 depicts a pop up menu, 106 depicts a text entry field, and 107 depicts two buttons. Those buttons may be "OK" and "Cancel", or buttons that expand the functionality of the IRP interface.

Figure 4:
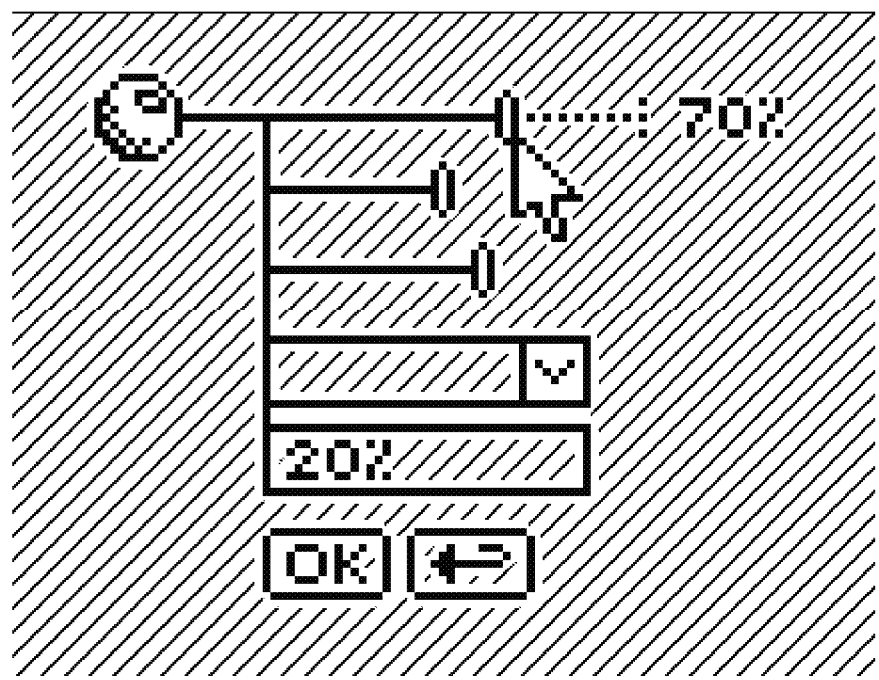
FIG. 4 is the interface of FIG. 3, showing the location of image pixels with shading.
Figure 7:
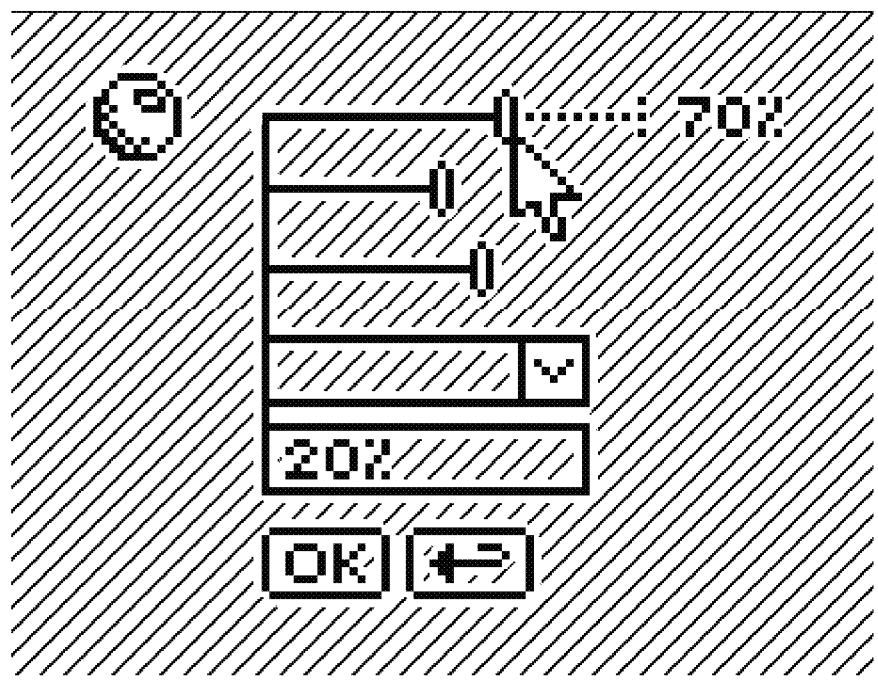
FIG. 7 is another embodiment of the interface of FIG. 4.

In FIG. 4, the shaded area represents the area of the interface where the actual image pixels are visible, and showing a bright halo around the primary control features and icon. Note that here the icon is graphically linked to the control elements. In another embodiment shown in FIG. 7, the icon is in the neighborhood of (e.g., near) the associated control elements, but is not otherwise linked to the control elements. A user of the interface will interpret the icon as being associated with the control elements, without further graphical connection being necessary.

2 Pointing Device Related Opacity

It will be obvious to those experienced in image editing that a lot of graphical UI elements superimposed over the image make it very difficult to edit the image or to judge the quality of the results.

The disclosures above show how to remedy these drawbacks to a certain extent, since the amount of pixels (and thereby the amount of visual noise) is reduced on the screen.

More can be done, however, to avoid distraction from the image impression. Preferably, the system continuously calculates where the superimposed primary control elements are located in the image, and also co-continuously calculates where the pointing device's cursor is at. What remains then to be done is to display those control elements with a lower opacity that are spatially remote from the pointing device cursor, while displaying those being closer to the pointing device cursor with higher opacity. In addition, the system could hide all control elements entirely when the cursor is not over the image. This allows the user to change controls and to view the image without distraction, while the transition between the two modes is almost effortless.

Below is an example table that details how the opacities could be organized:

| Location of Pointing Device Cursor | Display Mode |
|---|---|
| Close to a control element | display with 100% opacity |
| Not close to control element | opacity = (100% − spatial distance in pixels) but at least 30%. |
| Not over image | opacity = 0% |

3 The Calculation Sequence

The calculation sequence is not entirely trivial, since a single area on the screen (the preview of the image with superimposed primary control elements) functions both as a preview, (id est it depends on the filter parameters) while it functions as a user interface that defines the filter parameters. See FIG. 5.

4 Superimposing the Primary Control Elements over the Image

For this routine a method is required that superimposes the primary control elements over the image in such a way that they are visible at all times and over all possible tonalities of an image. As discussed above, this can be done by superimposing first a blurred version of the primary control elements and then superimposing a non-blurred version of the control elements. Preferably, the blurred version should be bright and the non-burred version should be dark or vice versa, for instance by applying a brightness-inversion routine onto the blurred version.

Please note that this routine needs to be re-applied whenever a parameter is adjusted by the user.

Figure 5:
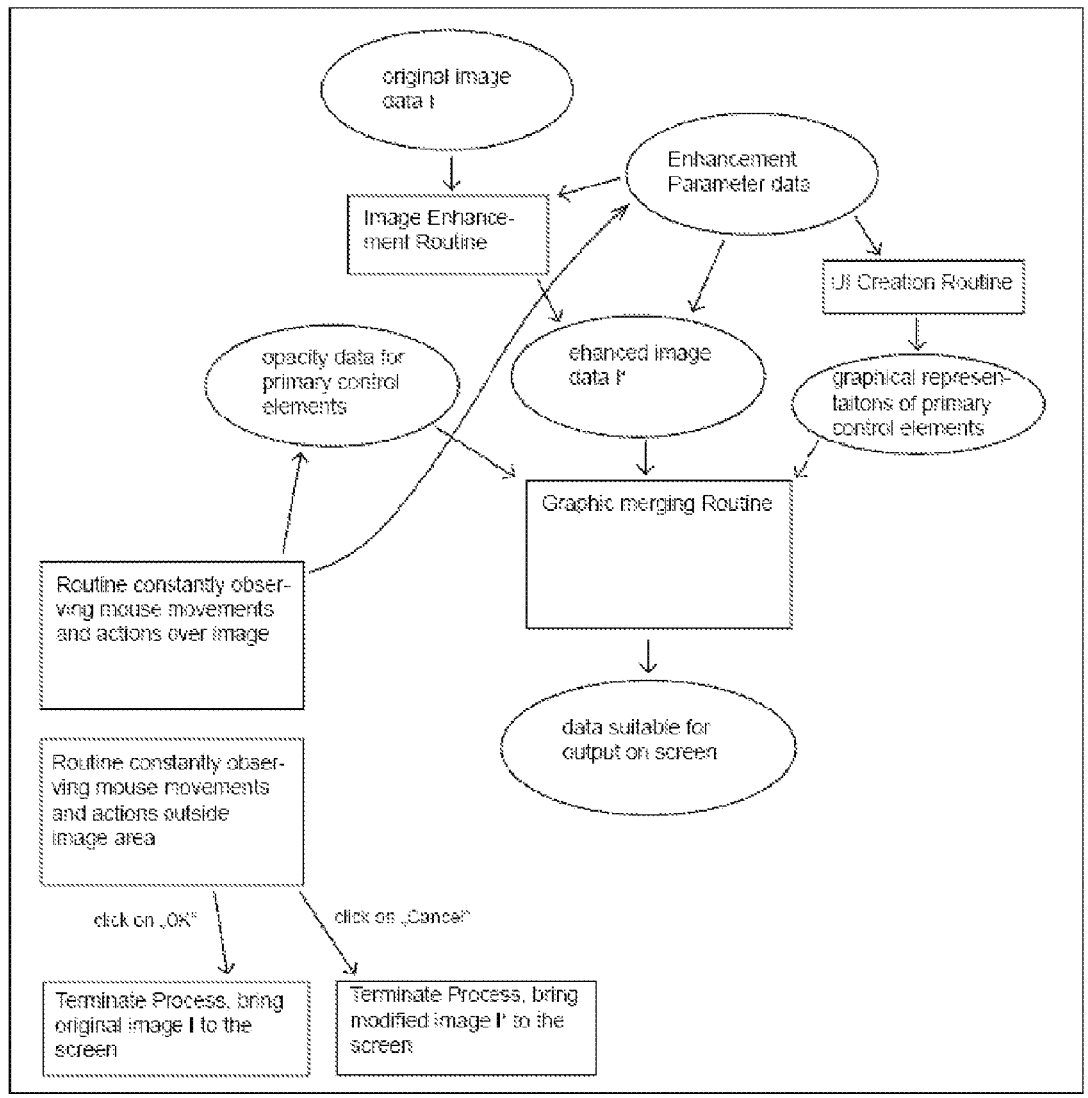
FIG. 5 is a flowchart showing the processing sequence. Rectangles represent routines, while elliptical shapes represent data.
Figure 6:
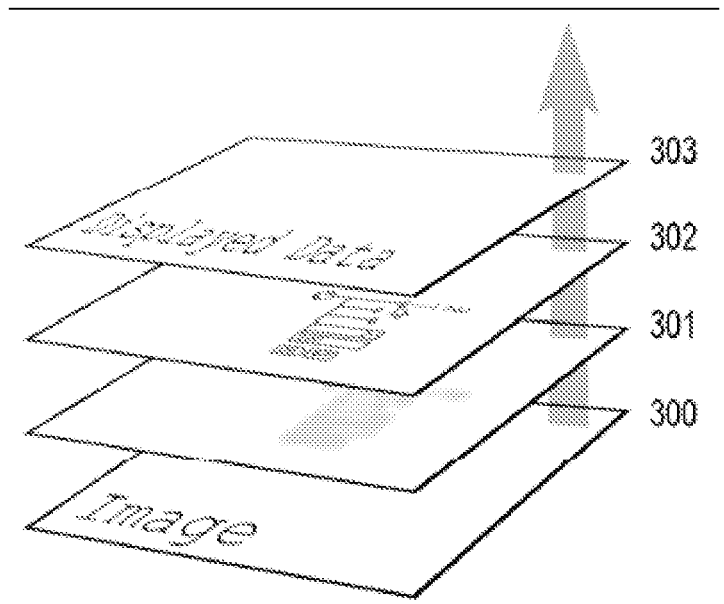
FIG. 6 is a representation of the graphic merging routine shown in FIG. 5.

With reference to FIG. 6, the processing sequence for the "graphic merging routine" of FIG. 5 is shown. An image (300) is first superimposed with a blurred version of the primary control elements (301) and then with a non-blurred version of the primary control elements (302), resulting in the displayed data (303) that are then suitable to be presented to the user on the screen. Note that the intensities of the layers (301) and (302) are dependent on the "opacity data" referenced in the flowchart in FIG. 5.

All features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purposes, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

I claim:

1. A computer-implemented method comprising:
    generating a user interface that is configured to modify a portion of an image, wherein:
        the user interface includes a primary control element and a secondary control element,
        the primary control element includes a blurred layer that is superimposed on a non-blurred layer such that edges of the blurred layer align with edges of the non-blurred layer, and
        the primary control element includes a slider and a halo that are visible independent of a color of the portion of the image over which the primary control element is displayed;
    superimposing the user interface onto the image such that the primary control element overlaps with the image;
    determining that a position of a pointing device symbol is closer to the primary control element than the secondary control element;
    displaying the primary control element as being more opaque than the secondary control element based on the position of the pointing device symbol being closer to the primary control element than the secondary control element; and
    responsive to determining that the pointing device symbol is not over the image, changing the primary control element to be invisible.

2. The method of claim 1, further comprising omitting a section of the slider that is not in use.

3. The method of claim 1, wherein the secondary control element includes a confirmation button and a cancellation button.

4. The method of claim 1, wherein the secondary control element is displayed outside of an area that includes the image.

5. The method of claim 1, wherein the primary control element is graphically linked to an icon.

6. The method of claim 1, wherein the primary control element is associated with an icon.

7. The method of claim 1, wherein an original version of the primary control element is superimposed over the blurred layer of the primary control element.

8. The method of claim 1, wherein the user interface further includes a border that is superimposed over the image and that surrounds the primary control element.

9. A computer program product residing on a non-transitory computer readable medium having a plurality of instructions stored thereon which, when executed by a processor, cause the processor to perform operations comprising:
    generating a user interface that is configured to modify a portion of an image, wherein:
        the user interface includes a primary control element and a secondary control element,
        the primary control element includes a blurred layer that is superimposed on a non-blurred layer such that edges of the blurred layer align with edges of the non-blurred layer, and
        the primary control element includes a slider and a halo that are visible independent of a color of the portion of the image over which the primary control element is displayed;
    superimposing the user interface onto the image;
    determining that a position of a pointing device symbol is closer to the primary control element than the secondary control element;
    displaying the primary control element as being more opaque than the secondary control element based on the position of the pointing device symbol being closer to the primary control element than the secondary control element; and
    responsive to determining that the pointing device symbol is not over the image, causing the primary control element to be displayed with 0% opacity.

10. The computer program product of claim 9, wherein the operations further comprise omitting a section of the slider that is not in use.

11. The computer program product of claim 9, wherein the secondary control element includes a confirmation button and a cancellation button.

12. The computer program product of claim 9, wherein the secondary control element is displayed outside of an area that includes the image.

13. The computer program product of claim 9, wherein the primary control element is graphically linked to an icon.

14. The computer program product of claim 9, wherein the non-blurred layer is brighter than the blurred layer.

15. The computer program product of claim 9, wherein an original version of the primary control element is superimposed over the blurred layer.

16. A computing system comprising:
    at least one processor;
    at least one memory architecture coupled with the at least one processor;
    one or more software modules executed on the at least one processor and the at least one memory architecture, wherein the one or more software modules are configured to perform operations including:
        generating a user interface that is configured to modify a portion of an image, wherein:
            the user interface includes a primary control element and a secondary control element,
            the primary control element includes a blurred layer that is superimposed on a non-blurred layer such that edges of the blurred layer align with edges of the non-blurred layer, and
            the primary control element includes a slider and a halo that are visible independent of a color of the portion of the image over which the primary control element is displayed;
        superimposing the user interface onto the image;
        determining that a position of a pointing device symbol is closer to the primary control element than the secondary control element;
        displaying the primary control element as being more opaque than the secondary control element based on the position of the pointing device symbol being closer to the primary control element than the secondary control element; and
        responsive to determining that the pointing device symbol is not over the image, changing the primary control element to be invisible.

17. The computing system of claim 16, wherein the operations further comprise omitting a section of the slider that is not in use.

18. The computing system of claim 16, wherein the secondary control element includes a confirmation button and a cancellation button.

19. The computing system of claim 16, wherein the blurred layer is brighter than the non-blurred layer.

20. The computing system of claim 16, wherein an original version of the primary control element is superimposed over the blurred layer.

* * * * *